(12) United States Patent
Gursoy et al.

(10) Patent No.: US 10,795,999 B1
(45) Date of Patent: Oct. 6, 2020

(54) IDENTIFYING AND PROTECTING AGAINST COMPUTER SECURITY THREATS WHILE PRESERVING PRIVACY OF INDIVIDUAL CLIENT DEVICES USING CONDENSED LOCAL DIFFERENTIAL PRIVACY (CLDP)

(71) Applicant: SYMANTEC CORPORATION, Mountain View, CA (US)

(72) Inventors: Mehmet Emre Gursoy, Atlanta, GA (US); Acar Tamersoy, Culver City, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 194 days.

(21) Appl. No.: 16/146,217

(22) Filed: Sep. 28, 2018

(51) Int. Cl.
| | | |
|---|---|---|
| G06F 21/00 | (2013.01) | |
| G06F 21/56 | (2013.01) | |
| G06F 21/62 | (2013.01) | |
| G06F 21/55 | (2013.01) | |

(52) U.S. Cl.
CPC .......... *G06F 21/567* (2013.01); *G06F 21/554* (2013.01); *G06F 21/566* (2013.01); *G06F 21/6254* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 9,594,741 B1 | 3/2017 | Thakurta et al. | |
| 9,705,908 B1 | 7/2017 | Thakurta et al. | |
| 10,154,054 B2 * | 12/2018 | Thakurta | H04L 63/1425 |
| 10,599,868 B2 * | 3/2020 | Barraclough | G06F 1/28 |
| 2007/0130147 A1 * | 6/2007 | Dwork | G06F 21/6245 |
| 2017/0353855 A1 * | 12/2017 | Joy | H04W 12/02 |
| 2018/0101697 A1 * | 4/2018 | Rane | H04L 9/085 |

OTHER PUBLICATIONS

Apple, Inc.; "Differential Privacy"; white paper; located at: 1. https://www.apple.com/privacy/docs/Differential_Privacy_Overview_pdf; accessed on Sep. 27, 2018; 3 pages.

(Continued)

*Primary Examiner* — Andrew J Steinle
(74) *Attorney, Agent, or Firm* — Maschoff Brennan

(57) ABSTRACT

Identifying and protecting against computer security threats while preserving privacy of individual client devices using condensed local differential privacy (CLDP). In one embodiment, a method may include accessing an actual data value, generating a perturbed data value by adding noise to the actual data value, aggregating the perturbed data values to at least partially cancel out aggregate noise of the aggregated perturbed data values at a population level, analyzing, using CLDP, the aggregated perturbed data values to identify a computer security threat, and in response, protecting against the computer security threat by performing a remedial action. The amount of noise added to each actual data value may be probabilistically computed such that a probability of noise being added decreases as an amount of added noise increases. The perturbed data values may preserve privacy of the actual data values.

20 Claims, 4 Drawing Sheets

(56) References Cited

OTHER PUBLICATIONS

Fanti et al.; "Building a RAPPOR with Unknown: Privacy-Preserving Learning of Associations and Data Dictionaries"; presented at the Proceedings on Privacy Enhancing Technologies; 2016; 21 pages.
Ding et al.; "Collecting Telemetry Data Privately"; presented at the 31st Conference on Neutral Information Processing Systems (NIPS 2017); 16 pages.
Bittau et al.; "PROCHLO: Strong Privacy for Analytics in the Crowd"; presented at the SOSP on Oct. 28, 2017 in Shanghai, China; 19 pages.
Erlingsson et al.; "RAPPOR: Randomized Aggregatable Privacy-Preserving Ordinal Response"; Presented at the CCS'14 on Nov. 3-7, 2014 in Scottsdale, Arizona; 14 pages.
Wang et al.; "Locally Differentially Private Protocols for Frequency Estimation"; presented at the 26th USENIX Security Symposium on Aug. 16-18, 2017 in Vancouver, BC, Canada; 19 pages.
Apple, Inc.; "Learning with Privacy at Scale"; white paper; located at: https://machinelearning.apple.com/docs/learning-with-privacy-at-scale/appledifferentialprivacysystem.pdf; accessed on Sep. 27, 2018; 25 pages.
Qin et al.; "Generating Synthetic Decentralized Social Graphs with Local Differential Privacy"; Presented at the CCS'14 on Oct. 30-Nov. 3, 2014 in Dallas, Texas; 14 pages.
C. Dwork, "Differential privacy," in International Colloquium on Automata, Languages, and Programming. Springer, 2006, pp. 1-12.
C. Dwork, A. Roth et al., "The algorithmic foundations of differential privacy," Foundations and Trends in Theoretical Computer Science, vol. 9, No. 3-4, pp. 211-407, 2014.
N. Li, M. Lyu, D. Su, and W. Yang, "Differential privacy: From theory to practice," Synthesis Lectures on Information Security, Privacy, & Trust, vol. 8, No. 4, pp. 1-138, 2016.
J. C. Duchi, M. I. Jordan, and M. J. Wainwright, "Local privacy and statistical minimax rates," in 2013 IEEE 54th Annual Symposium on Foundations of Computer Science (FOCS). IEEE, 2013, pp. 429-438.
P. Kairouz, S. Oh, and P. Viswanath, "Extremal mechanisms for local differential privacy," in Advances in Neural Information Processing Systems, 2014, pp. 2879-2887.
R. Bassily and A. Smith, "Local, private, efficient protocols for succinct histograms," in Proceedings of the 47th Annual ACM Symposium on Theory of Computing. ACM, 2015, pp. 127-135.
A. Smith, A. Thakurta, and J. Upadhyay, "Is interaction necessary for distributed private learning?" in 2017 IEEE Symposium on Security and Privacy (SP). IEEE, 2017, pp. 58-77.
M. Bun, J. Nelson, and U. Stemmer, "Heavy hitters and the structure of local privacy," in Proceedings of the 35th ACM SIGMOD-SIGACT-SIGAI Symposium on Principles of Database Systems. ACM, 2018, pp. 435-447.
Z. Qin, Y. Yang, T. Yu, I. Khalil, X. Xiao, and K. Ren, "Heavy hitter estimation over set-valued data with local differential privacy," in Proceedings of the 2016 ACM SIGSAC Conference on Computer and Communications Security. ACM, 2016, pp. 192-203.
T. Wang, N. Li, and S. Jha, "Locally differentially private frequent itemset mining," in IEEE Symposium on Security and Privacy (SP). IEEE, 2018.
G. Cormode, T. Kulkarni, and D. Srivastava, "Marginal release under local differential privacy," in Proceedings of the 2018 International Conference on Management of Data. ACM, 2018, pp. 131-146.
Z. Zhang, T. Wang, N. Li, S. He, and J. Chen, "Calm: Consistent adaptive local marginal for marginal release under local differential privacy," in Proceedings of the 2018 ACM SIGSAC Conference on Computer and Communications Security. ACM, 2018, pp. 212-229.
R. Chen, H. Li, A. Qin, S. P. Kasiviswanathan, and H. Jin, "Private spatial data aggregation in the local setting," in 2016 IEEE 32nd International Conference on Data Engineering (ICDE). IEEE, 2016, pp. 289-300.
Q. Ye, H. Hu, X. Meng, and H. Zheng, "Privkv: Key-value data collection with local differential privacy," in IEEE Symposium on Security and Privacy (SP). IEEE, 2019.
N. Wang, X. Xiao, Y. Yang, T. D. Hoang, H. Shin, J. Shin, and G. Yu, "Privtrie: Effective frequent term discovery under local differential privacy," in IEEE International Conference on Data Engineering (ICDE), 2018.
M. Andres, N. Bordenabe, K. Chatzikokolakis, and C. Palamidessi, "Geo-indistinguishability: Differential privacy for location-based systems," in Proceedings of the 2013 ACM SIGSAC Conference on Computer and Communications Security. ACM, 2013, pp. 901-914.
N. Bordenabe, K. Chatzikokolakis, and C. Palamidessi, "Optimal geo-indistinguishable mechanisms for location privacy," in Proceedings of the 2014 ACM SIGSAC Conference on Computer and Communications Security. ACM, 2014, pp. 251-262.
K. Chatzikokolakis, M. E. Andres, N. E. Bordenabe, and C. Palamidessi, "Broadening the scope of differential privacy using metrics," in International Symposium on Privacy Enhancing Technologies (PETS). Springer, 2013, pp. 82-102.
M. Hay, C. Li, G. Miklau, and D. Jensen, "Accurate estimation of the degree distribution of private networks," in 9th IEEE International Conference on Data Mining (ICDM). IEEE, 2009, pp. 169-178.
U.S. Appl. No. 16/146,189, titled "Identifying and Protecting Against Computer Security Threats While Preserving Privacy of Individual Client Devices Using Condensed Local Differential Privacy (CLDP)"; filed Sep. 28, 2018; 59 pages.

\* cited by examiner

US 10,795,999 B1

IDENTIFYING AND PROTECTING AGAINST COMPUTER SECURITY THREATS WHILE PRESERVING PRIVACY OF INDIVIDUAL CLIENT DEVICES USING CONDENSED LOCAL DIFFERENTIAL PRIVACY (CLDP)

BACKGROUND

Modern computers and computer networks are subject to a variety of security threats. For example, malware is software intentionally designed to cause damage to a computer or computer network. Malware typically does damage after it infects a targeted computer. A malware outbreak occurs when malware infects multiple computers. Unfortunately, it can be difficult to detect a malware outbreak in order to limit or prevent damage from the malware.

One method for detecting a malware outbreak involves a security company collecting and analyzing data from their clients' computers. Although a security company may benefit from collecting this data from their clients' computers, some clients may object to this collection of data as an invasion of privacy.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for identifying and protecting against computer security threats while preserving privacy of individual client devices using condensed local differential privacy (CLDP) may be performed, at least in part, by a computer device including at least one processor. The method may include accessing, at each of multiple local client devices, an actual data value. The method may also include generating, at each of the local client devices, a perturbed data value by adding noise to the actual data value. The amount of noise being added to each actual data value may be probabilistically computed such that a probability of noise being added decreases as an amount of added noise increases. The method may further include sending, from each of the local client devices, the perturbed data value to a remote server device. The method may also include aggregating, at the remote server device, the perturbed data values to at least partially cancel out aggregate noise of the aggregated perturbed data values at a population level. The method may further include analyzing, at the remote server device, using CLDP, the aggregated perturbed data values to identify a computer security threat to the local client devices while preserving privacy of the actual data values by preventing the remote server device from inferring the actual data value of any of the local client devices. The method may also include, in response to identifying the computer security threat, protecting against the computer security threat by performing, at one or more of the local client devices, a remedial action to protect the one or more local client devices from the computer security threat.

In some embodiments, the performing, at the one or more local client devices, of the remedial action may include one or more of blocking the one or more local client devices from accessing a network, rolling back one or more changes at the one or more local client devices that were made in response to the computer security threat, or temporarily freezing activity at the one or more local client devices, or some combination thereof.

In some embodiments, each actual data value may be an actual ordinal data value, and the noise may be added to each actual ordinal data value with a probability of noise being added decreasing exponentially as an amount of added noise increases.

In some embodiments, the computer security threat may include a malware outbreak. In these embodiments, the actual data values may include information regarding a count and/or a frequency of malware-related detection events observed on each of the local client devices during a time period. In these embodiments, the adding of noise to each actual data value may include modifying the count and/or the frequency of the malware-related detection events to prevent the remote server device from inferring the actual count and/or the frequency of the malware-related detection events of any of the local client devices. Also, in these embodiments, the malware-related detection events may include detection of a particular malware, and the malware outbreak may include an outbreak of the particular malware. Further, in these embodiments, the analyzing, at the remote server device, of the aggregated perturbed data values to identify the malware outbreak may include analyzing, at the remote server device, the aggregated perturbed data values to identify a timing of the particular malware infecting the local client devices.

Further, in some embodiments, one or more non-transitory computer-readable media may include one or more computer-readable instructions that, when executed by one or more processors of a computer device, cause the computer device to perform a method for identifying and protecting against computer security threats while preserving privacy of individual client devices using condensed local differential privacy (CLDP).

Also, in some embodiments, a remote server device may include one or more processors and one or more non-transitory computer-readable media including one or more computer-readable instructions that, when executed by the one or more processors, cause the remote server device to perform a method for identifying and protecting against computer security threats while preserving privacy of individual client devices using condensed local differential privacy (CLDP).

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
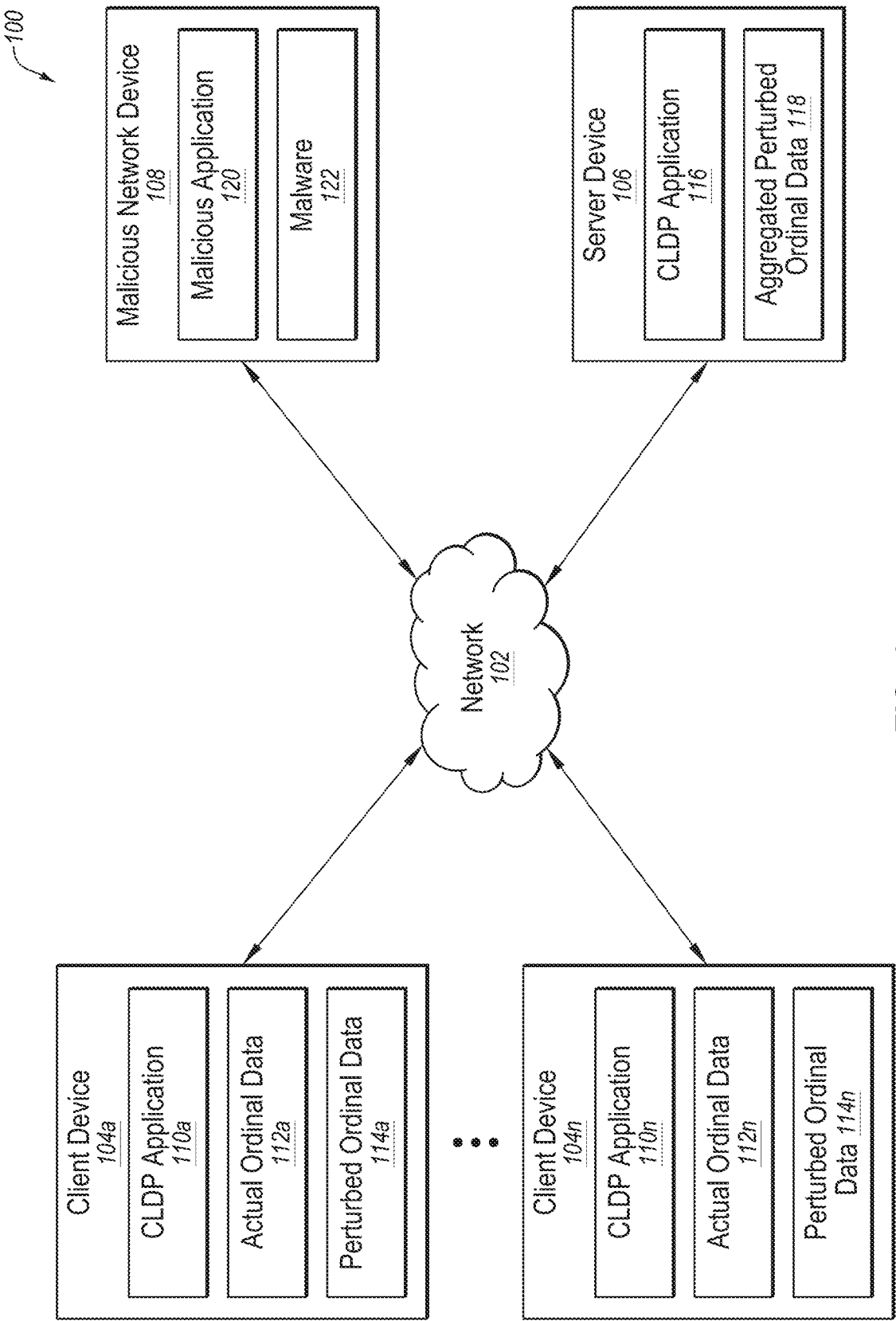
FIG. 1 illustrates an example system configured for identifying and protecting against computer security threats while preserving privacy of individual client devices using condensed local differential privacy (CLDP)

Security threats to computers and computer networks can be difficult to detect. For example, when a malware outbreak occurs due to malware infecting multiple computers, it can be difficult to detect the malware outbreak in order to limit or prevent damage from the malware. One method employed to detect a malware outbreak involves a security company collecting data from their clients' computers. However, some clients object to this collection of data as an invasion of privacy. For example, a client may object to sharing the exact number of malware infections experienced by each of its computers for fear that this data may be embarrassing if obtained by competitors or customers. Additionally or alternatively, a client may object to sharing the exact number of malware infections experienced by each of its computers for fear that purveyors of the malware may obtain this data and use it to execute future malware attacks on the client. Therefore, although a security company may benefit from the collection of data from its clients' computers, the clients may feel that this collection of potentially sensitive data intrudes upon their privacy, and as such, they may not be comfortable with opting-in to this data collection unless their privacy can be protected.

One method a security company may employ to collect client data while offering some level of privacy guarantee to the client involves using local differential privacy (LDP). Using LDP, each client locally perturbs or randomizes their actual data, and shares the perturbed version of their actual data with the security company. After observing a client's perturbed data, the security company may not be able to infer or reverse-engineer the client's actual data with strong confidence. Nevertheless, over large populations, the impact of perturbation and randomization may be expected to cancel out after the clients' perturbed or randomized data is aggregated, and therefore an analysis of the aggregated perturbed or randomized data may be able accurately to estimate aggregate statistics and trends pertaining to the whole population.

Unfortunately, however, some LDP methods require collecting data from relatively large populations (e.g., on the order of millions of data values) to derive accurate insights. The requirement for relatively large user populations greatly hinders the practicality of LDP in many applications, since relatively large populations are not always available. For example, when attempting to detect and diagnose a malware outbreak, there may be only a relatively small number (e.g., on the order of only thousands of client devices) of computers around the world infected by a particular malware. Therefore, for this relatively small population, the impact of some LDP methods' perturbing or randomizing will not cancel out, resulting in aggregate statistics that are too noisy to be used in accurately estimating aggregate statistics and trends pertaining to the whole population. Thus, some LDP methods may fail to be useful in accurately detecting and diagnosing a malware outbreak, resulting in damage to computers infected in the malware outbreak.

The embodiments disclosed herein may provide various benefits. In particular, the embodiments disclosed herein may, for example, enable identifying and protecting against computer security threats while preserving privacy of individual client devices using condensed local differential privacy (CLDP). In some embodiments, CLDP applications at local client devices may access, at the local client devices, actual data values and then generate, at the local client devices, perturbed data values by adding noise to the actual data values. The CLDP applications may probabilistically compute the noise and then add the noise to the actual data values at each of the local client devices such that a probability of noise being added decreases as an amount of added noise increases. The CLDP applications may then send the perturbed data values to a remote server device. The perturbed data values may preserve privacy of the actual data values by preventing the remote server device from inferring the actual data value of any of the local client devices. A corresponding CLDP application at the remote server device may aggregate, at the remote server device, the perturbed data values from the local client devices to at least partially cancel out the aggregate noise of the aggregated perturbed data values at a population level. The CLDP application may then analyze, at the remote server device, the aggregated perturbed data values to identify a computer security threat and, in response to identifying the computer security threat, perform, at one or more of the local client devices, a remedial action to protect the one or more local client devices from the computer security threat.

Some embodiments disclosed herein are thus able to identify and protect against computer security threats while preserving privacy of individual client devices using CLDP. Unlike some LDP methods which require collecting data from relatively large populations (e.g., on the order of millions of data values) to derive accurate insights, the CLDP methods disclosed herein may be employed on relatively small populations (e.g., on the order of only thousands of client devices) and still derive accurate insights. For example, when attempting to detect and diagnose a malware outbreak, the CLDP methods disclosed herein may aggregate perturbed data values from only a relatively small number of computers around the world infected by a particular malware, and yet the perturbing of the actual data value can still be cancelled out, resulting in aggregate statistics that reduce noise sufficiently to be used in accurately estimating aggregate statistics and trends pertaining to the whole population. Thus, the CLDP methods disclosed herein may be employed to accurately detect and diagnose a malware outbreak, resulting in the minimizing or preventing of damage to computers infected in the malware outbreak and/or the avoiding of infections of additional computers.

Although some embodiments of the CLDP methods are disclosed herein as being employed in connection with identifying and protecting against a malware outbreak, it is understood that a malware outbreak is only one of countless practical applications for the CLDP methods disclosed herein. For example, the CLDP methods disclosed herein may be employed in other practical applications where it is desirable to collect and aggregate ordinal data in a privacy-preserving manner in order to entice clients to be willing to opt-in to data collection. These applications may include, but are not limited to, a security company gathering sensitive data from its clients such as device statistics, server logs, product telemetry, and other various security-related information. Therefore, the CLDP methods disclosed herein are not limited to being employed in connection with identifying and protecting against a malware outbreak, but may also or instead be employed in any other practical application.

As used herein, the term "ordinal data value" refers to a data value with a data type that stems from a finite metric space, such as where the item universe U is discrete and well-defined, and there exists a built-in distance function d: U×U→[0,infinity] satisfying the conditions of being a metric. This setting covers a variety of useful data types in practice: (i) discrete numeric or integer domains where d can be the absolute value distance between two items, (ii) ordinal item domains with total order, e.g., letters and strings ordered by alphabet dictionary order A<B<C, and (iii) categorical domains with tree-structured domain taxonomy where distance between two items can be measured using the depth of their most recent common ancestor in the taxonomy tree.

Turning to the figures, FIG. 1 illustrates an example system 100 configured for identifying and protecting against computer security threats while preserving privacy of individual client devices using CLDP. The system 100 may include a network 102, client devices 104a-104n, a server device 106, and a malicious network device 108.

In some embodiments, the network 102 may be configured to communicatively couple the client devices 104a-104n, the server device 106, and the malicious network device 108 to one another as well as to other network devices and other networks. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
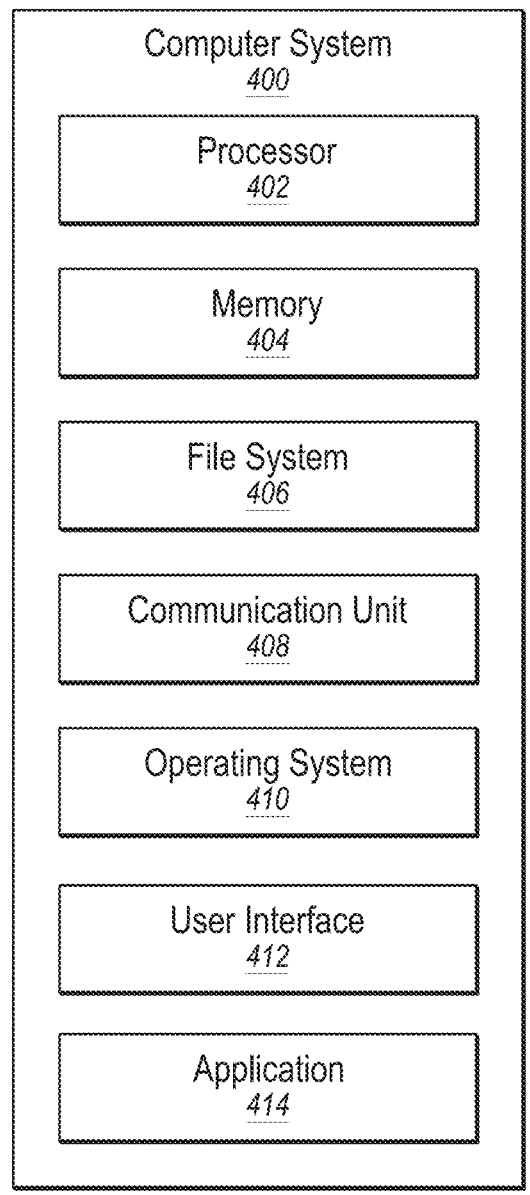
FIG. 4 illustrates an example computer system that may be employed in identifying and protecting against computer security threats while preserving privacy of individual client devices using CLDP.

In some embodiments, the malicious network device 108 may be any computer system capable of communicating over the network 102 and capable of executing a malicious application 120 that attempts to infect other network devices with malware 122, examples of which are disclosed herein in connection with the computer system 400 of FIG. 4. In some embodiments, the malware 122 may be, or may include the functionality of, one or more of a spyware, a virus, a worm, a logic bomb, a trapdoor, a Trojan horse, a Remote Admin Trojan (RAT), a mobile malicious code, a malicious font, and a rootkit. When the malicious application 120 is able to infect multiple network devices with the malware 122, the malicious application 120 has achieved an outbreak of the malware 122.

In some embodiments, each of the client devices 104a-104n may be any computer system capable of communicating over the network 102 and capable of executing a CLDP application, examples of which are disclosed herein in connection with the computer system 400 of FIG. 4. The client devices 104a-104n may include CLDP applications 110a-110n, respectively. The CLDP applications 110a-110n may be configured to implement one or more actions of the CLDP methods disclosed herein. For example, the CLDP applications 110a-110n may be configured to access actual ordinal data 112a-112n and then generate perturbed ordinal data 114a-114n by adding noise to the actual ordinal data 112a-112n.

In some embodiments, the actual ordinal data 112a-112n may relate to an outbreak of the malware 122 which is maliciously disseminated by the malicious application 120 executing on the malicious network device 108. In these embodiments, the actual ordinal data 112a-112n may be information regarding a count and/or a frequency of detection events of the malware 122 observed on each of the client devices 104a-104n during a time period. In these embodiments, when the CLDP applications 110a-110n add noise to the actual ordinal data 112a-112n, the adding of noise may include modifying the count and/or the frequency of the detection events of the malware 122 to prevent the server device 106 from inferring the actual count and/or the frequency of the detection events of the malware 122 of any of the client devices 104a-104n.

In some embodiments, the server device 106 may be any computer system capable of communicating over the network 102 and capable of executing a CLDP application 116, examples of which are disclosed herein in connection with the computer system 400 of FIG. 4. The CLDP application 116 may be configured to implement one or more actions of the CLDP methods disclosed herein. For example, the CLDP application 116 may be configured to receive the perturbed ordinal data 114a-114n from the client devices 104a-104n and then aggregate the perturbed ordinal data 114a-114n into aggregated perturbed ordinal data 118 to at least partially cancel out the aggregate noise at a population level that was added to the actual ordinal data 112a-112n. The CLDP application 116 may then analyze the aggregated perturbed ordinal data 118 to identify an outbreak of the malware 122 on the client devices 104a-104n and then protect against the outbreak of the malware 122 by performing a remedial action to protect one or more of the client devices 104a-104n from the outbreak of the malware 122. This remedial action may include, for example, blocking one or more of the client devices 104a-104n from accessing the network 102, rolling back one or more changes at one or more of the client devices 104a-104n that were made in response to the actual outbreak of the malware 122 (e.g., one or more changes made by the malware 122), or temporarily freezing activity at one or more of the client devices 104a-104n, or some combination thereof.

Therefore, the CLDP applications 110a-110n and 116 may cooperate to identify and protect against an outbreak of the malware 122 while preserving privacy of the individual client devices 104a-104n using CLDP. Unlike some LDP methods which require collecting data from relatively large populations (e.g., on the order of millions of client devices) to derive accurate insights, the CLDP applications 110a-110n and 116 may employ the CLDP methods disclosed herein on the relatively small population of the client devices 104a-104n (e.g., on the order of only thousands of client devices) and still derive accurate insights. For example, when attempting to detect and diagnose an outbreak of the malware 122, the CLDP applications 110a-110n and 116 may employ the CLDP methods disclosed herein to aggregate the perturbed ordinal data 114a-114n from only a relatively small number of the client devices 104a-104n infected by the malware 122, and yet the perturbing of the actual ordinal data 112a-112n can still be cancelled out, resulting in aggregate statistics that reduce noise sufficiently to be used in accurately estimating aggregate statistics and trends pertaining to the whole population of the client devices 104a-104n. Thus, the CLDP applications 110a-110n and 116 may employ the CLDP methods disclosed herein to accurately detect and diagnose an outbreak of the malware 122, resulting in the minimizing or preventing of damage to any of the client devices 104a-104n infected in the malware outbreak and/or the avoiding of infections of additional computers.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

Figure 2:
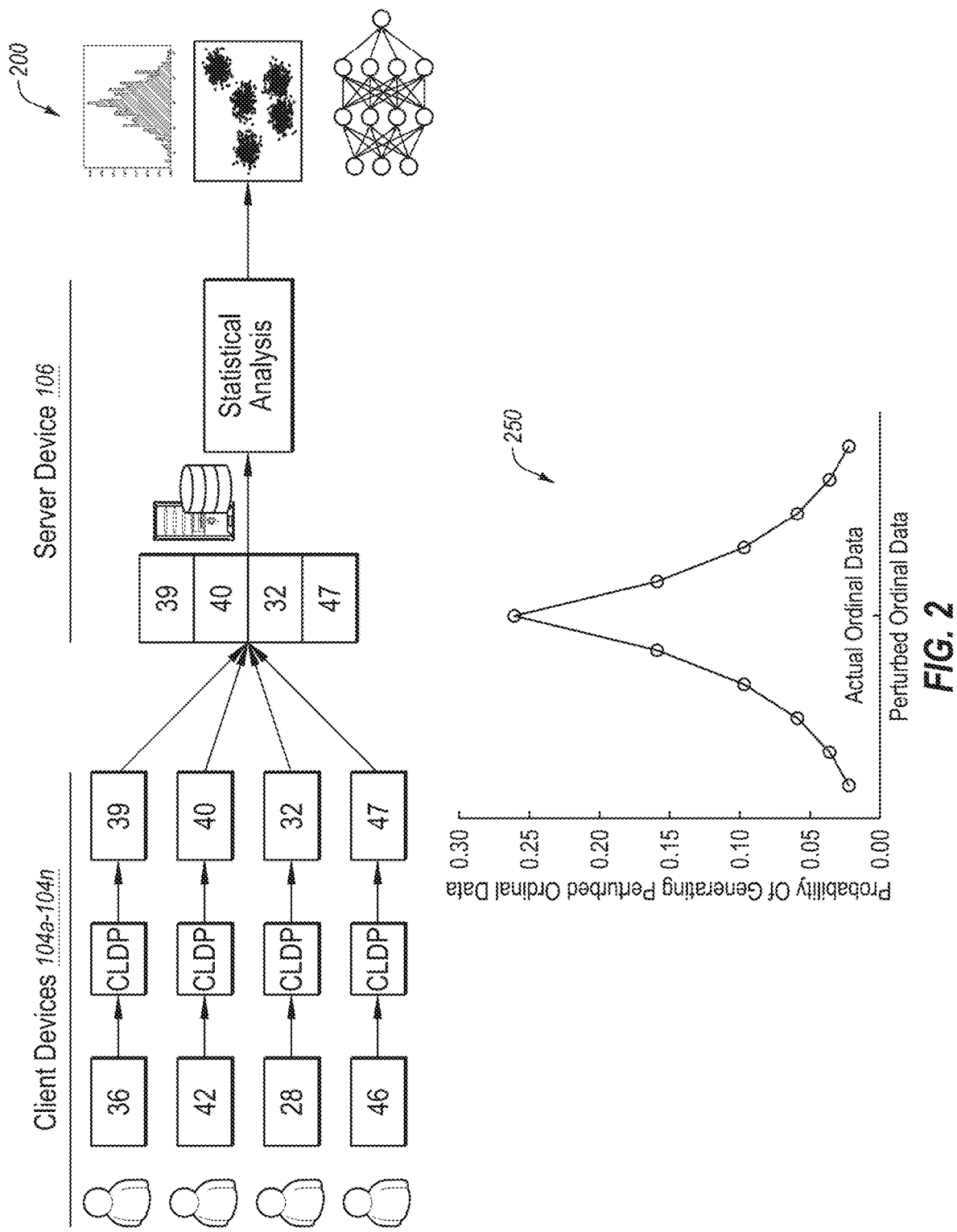
FIG. 2 is charts illustrating aspects of CLDP for ordinal data.

FIG. 2 is charts 200 and 250 illustrating aspects of CLDP for ordinal data. In particular, the chart 200 discloses that each of client devices 104a-104n may include actual ordinal data values (e.g., with data values 36, 42, 28, and 46) that the owner(s) of client devices 104a-104n would rather only share in a privacy-preserving matter. Therefore, instead of sharing the actual ordinal data, the client devices 104a-104n may first perturb the actual ordinal data value using CLDP into perturbed ordinal data values (e.g., with data values 39, 40, 32, and 47) by adding noise to the actual ordinal data values, before sending the perturbed ordinal data value to be aggregated by the server device 106. The aggregation of the perturbed ordinal data value may at least partially cancel out the noise at a population level that was added to the actual ordinal data, but the server device 106 may nevertheless be prevented from inferring the actual ordinal data of any of the client devices 104a-104n. The server device 106 may then perform an analysis of the aggregated perturbed ordinal data, such as a statistical analysis, in order to accurately estimate aggregate statistics and trends pertaining to the whole population of the client devices 104a-104n.

Further, the charts 200 and 250 disclose that the noise that the client devices 104a-104n add to the actual ordinal data values may be probabilistically computed with a probability of relatively less noise being added to the actual ordinal data being higher than a probability of relatively more noise being added to the actual ordinal data. Further, the noise added may be no noise (e.g. zero), positive noise, or negative noise. For example, as disclosed in the chart 250, the actual ordinal data value (represented by the center data value along the horizontal axis in the graph) may be perturbed to generate a perturbed ordinal data value (which may be any of the values along the horizontal axis in the graph) by adding noise to the actual ordinal data value. As disclosed in the graph in chart 250, the probability of relatively less noise being added to the actual ordinal data value is higher than a probability of relatively more noise being added to the actual ordinal data value. In some embodiments, the probability of generating a perturbed ordinal data value that is closer to the actual ordinal data value (e.g., with a relatively small amount of added noise) is higher than the probability of generating some other perturbed ordinal data value that is farther from the actual ordinal data value (e.g., with a relatively large amount of added noise). In some embodiments, noise is added to the actual ordinal data with a probability of noise being added decreasing (e.g., decreasing exponentially, or decreasing in a non-exponential way) as an amount of added noise increases.

In some embodiments, noise may be added to an actual ordinal data value v according to the following formula, where a CLDP mechanism M takes as input an actual ordinal value v and returns a perturbed ordinal data value y with probability:

$$Pr[M(v) = y] = \frac{e^{\frac{-\varepsilon \cdot d(v,y)}{2}}}{\sum_{z \in Range(M)} e^{\frac{-\varepsilon \cdot d(v,z)}{2}}}$$

which satisfies ε-CLDP, where ε, which is commonly referred to as the privacy budget, denotes the level of privacy protection offered by mechanism M (with lower values indicating higher protection), e is Euler's number, d(v, y) is a distance metric that returns the distance between data values v and y (e.g., the Euclidian distance), and Range (M) is a function that returns the set of all possible data values that can be taken as input by the CLDP mechanism M.

In some embodiments, an increasing probability employed in CLDP methods, such as that disclosed in the chart 250, may enable the collection of ordinal data in a privacy-preserving manner from relatively smaller populations than some LDP methods which employ a probability that is unchanging regardless of how much or how little noise (either positive or negative) is added to the actual ordinal value.

Modifications, additions, or omissions may be made to the charts 200 and 250 without departing from the scope of the present disclosure. In some embodiments, the charts 200 and 250 may include additional components similar to the components illustrated in FIG. 2 that each may be configured similarly to the components illustrated in FIG. 2.

Figure 3:
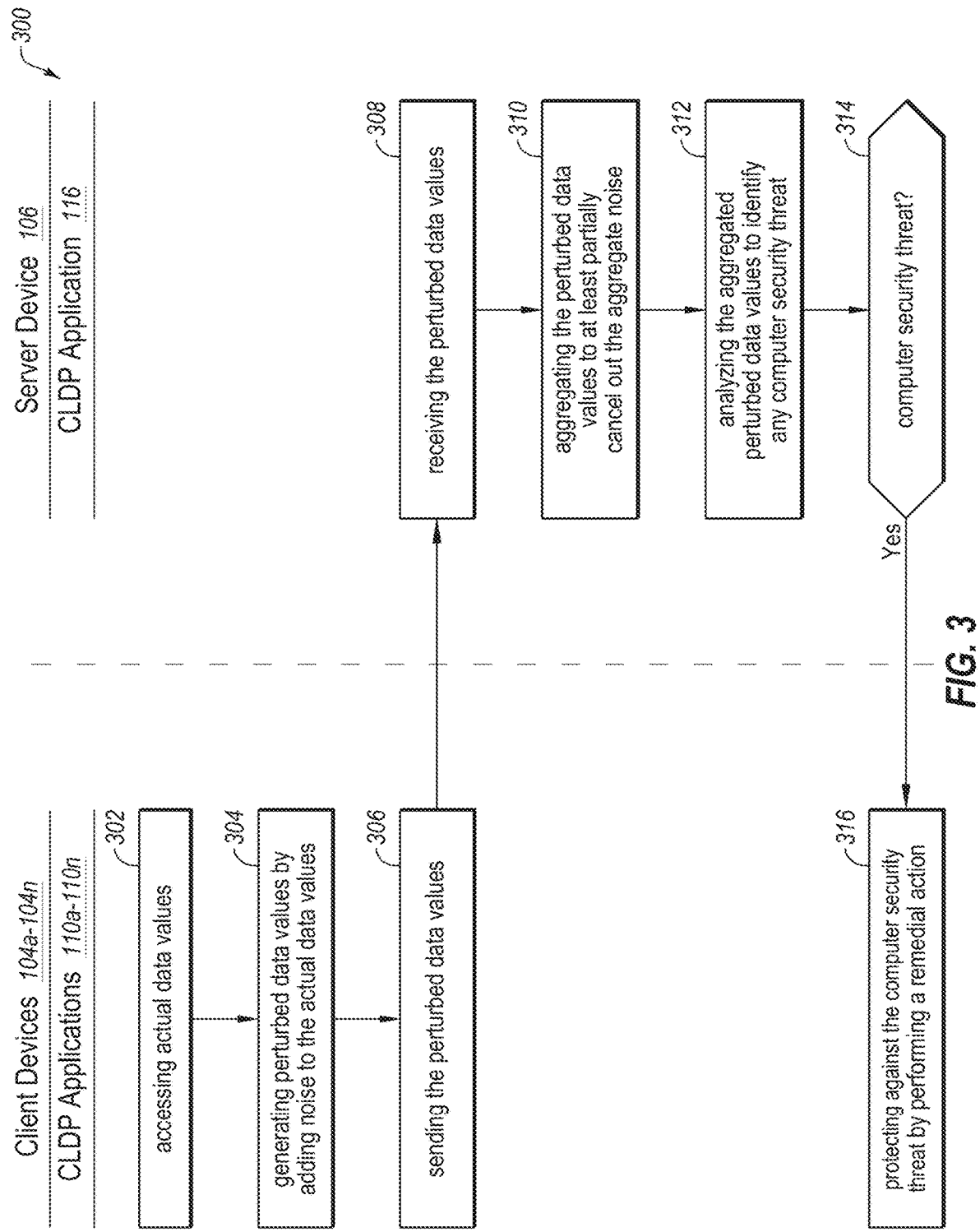
FIG. 3 is a flowchart of an example method for identifying and protecting against computer security threats while preserving privacy of individual client devices using CLDP.

FIG. 3 is a flowchart of an example method 300 for identifying and protecting against computer security threats while preserving privacy of individual client devices using CLDP. The method 300 may be performed, in some embodiments, by one or more applications, devices, or systems, such as by the CLDP applications 110a-110n and 116 of FIG. 1, or some other application(s), or some combination thereof. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at action 302, accessing actual data values. In some embodiments, the actual ordinal data value may be related to a computer security threat, such as a malware outbreak. In these embodiments, the actual data values related to the malware outbreak may include information regarding a count and/or a frequency of malware-related detection events observed on each of the local client devices during a time period. For example, the CLDP applications 110a-110n may access, at action 302, the actual ordinal data 112a-112n that may be related to an outbreak of the malware 122, such as information regarding a count and/or a frequency of detection events of the malware 122 observed on each of the client devices 104a-104n during a 24-hour, 72-hour, or some other malware-related time period.

The method 300 may include, at action 304, generating perturbed data values by adding noise to the actual data values. In some embodiments, the amount of noise being added to each actual data value may be probabilistically computed such that a probability of noise being added decreases as an amount of added noise increases. In some embodiments, each actual data value is an actual ordinal data value, and the noise may be added to each actual ordinal data value with a probability of noise being added decreasing exponentially as an amount of added noise increases. In some embodiments, the adding of noise to each actual data value may include modifying the count and/or the frequency of the malware-related detection events to prevent the remote server device from inferring the actual count and/or the frequency of the malware-related detection events of any of the local client devices. In these embodiments, the malware-related detection events may include detection of a particular malware, and the malware outbreak may include an outbreak of the particular malware. For example, the CLDP applications 110a-110n may generate, at action 304, the perturbed ordinal data 114a-114n by adding noise to the actual ordinal data 112a-112n, with the noise being probabilistically computed such that a probability of noise being added decreases as an amount of added noise increases, for example as disclosed in the chart 250. In this example, the adding of noise to the actual ordinal data 112a-112n may include modifying the count and/or the frequency of the detection events of the malware 122 observed on each of the client devices 104a-104n to prevent the server device 106 from inferring the actual count and/or the frequency of the detection events of the malware 122 of any of the local client devices 104a-104n.

The method 300 may include, at action 306, sending the perturbed data values and, at action 308, receiving the perturbed data values. For example, the CLDP applications 110a-110n may send, at action 306, and the CLDP application 116 may receive, at action 308, the perturbed ordinal data 114a-114n.

The method 300 may include, at action 310, aggregating the perturbed data values to at least partially cancel out the aggregate noise. In some embodiments, the aggregate noise may be at least partially cancelled out at a population level. For example, the CLDP application 116 may aggregate, at action 310, the perturbed ordinal data 114a-114n (which was received at action 308) into the aggregated perturbed ordinal data 118 to at least partially cancel out the noise (which was added at action 304) at a population level.

The method 300 may include, at action 312, analyzing the aggregated perturbed data values to identify any computer security threat. In some embodiments, the analyzing may be performed using CLDP to identify any computer security threat to the local client devices. In some embodiments, the analyzing may be performed while preserving privacy of the actual data values by preventing the remote server device from inferring the actual data value of any of the local client devices. In some embodiments, the analyzing of the perturbed ordinal data to identify the malware outbreak may include analyzing the perturbed ordinal data to identify a timing of the particular malware infecting the local client devices. For example, the CLDP application 116 may analyze, at action 312, the aggregated perturbed ordinal data 118 to identify any computer security threat, such as an outbreak of the malware 122, including identifying particular points in time when the client devices 104a-104n as a population were first infected, or as a population were infected again, with the malware 122. In this example, the CLDP application 116 may perform the analysis at action 312 of aggregated perturbed ordinal data 118 while preserving privacy of the actual ordinal data 112a-112n by preventing the server device 106 from inferring the actual ordinal data of any of the client devices (e.g., by preventing the server device 106 from inferring the actual ordinal data 112a of the client device 104a, or by preventing the server device 106 from inferring the actual ordinal data 112n of the client device 104n).

The method 300 may include, at action 314, determining whether there is a computer security threat. If so, the method 300 may include, at action 316, protecting against the computer security threat by performing a remedial action. In some embodiments, the performing of the remedial action at the one or more local client devices may include one or more of blocking the one or more local client devices from accessing a network, rolling back one or more changes at the one or more local client devices that were made in response to the computer security threat, or temporarily freezing activity at the one or more local client devices, or some combination thereof. For example, the CLDP application 116 may determine, at action 314, that a computer security threat such as an outbreak of the malware 122 has occurred (e.g. based on the analysis performed at action 312) and, in response, the CLDP application 116 may protect against the outbreak of the malware 122 by performing a remedial action. The remedial action may include, for example, blocking one or more of the client devices 104a-104n from accessing the network 102, rolling back one or more changes at one or more of the client devices 104a-104n that were made in response to the outbreak of the malware 122 (e.g., one or more changes made by the malware 122), or temporarily freezing activity at one or more of the client devices 104a-104n, or some combination thereof.

In some embodiments, the method 300 may result in the identifying and protecting against an outbreak of the malware 122 while preserving privacy of the individual client devices 104a-104n using CLDP. Unlike some LDP methods which require collecting data from relatively large populations (e.g., on the order of millions of client devices) to derive accurate insights, the method 300 may be employed on the relatively small population of the client devices 104a-104n (e.g., on the order of only thousands of client devices) and still derive accurate insights. For example, when attempting to detect and diagnose an outbreak of the malware 122, the method 300 may aggregate the perturbed ordinal data 114a-114n from only a relatively small number of the client devices 104a-104n infected by the malware 122, and yet the perturbing of the actual ordinal data 112a-112n can still be cancelled out, resulting in aggregate statistics that reduce noise sufficiently to be used in accurately estimating aggregate statistics and trends pertaining to the whole population of the client devices 104a-104n. Thus, the method 300 may accurately detect and diagnose an outbreak of the malware 122, resulting in the minimizing or preventing of damage to any of the client devices 104a-104n infected in the malware outbreak and/or the avoiding of infections of additional computers.

Although the actions of the method 300 are illustrated in FIG. 3 as discrete actions, various actions may be divided into additional actions, combined into fewer actions, reordered, expanded, or eliminated, depending on the desired implementation. For example, in some embodiments, actions 302, 304, 308, and 310 may be performed without performing other actions of the method 300. Also, in some embodiments, actions 302, 304, 308, 310, and 312 may be performed without performing other actions of the method 300, but the action 312 may be performed to analyze the aggregated perturbed ordinal data to make a determination other than whether any computer security threat has occurred. Further, in some embodiments, any of action 312, action 314, or action 316 may be performed by a network administrator or other entity that is different from the entity or entities performing the other actions of the method 300.

Further, it is understood that the method 300 may improve the functioning of a network device itself, and improve the technical field of local differential privacy (LDP), such as where LDP is employed in identifying and protecting against a computer security threat such as a malware outbreak. For example, the functioning of the client devices 104a-104n and the server device 106 may themselves be improved by the method 300, by identifying and protecting against an outbreak of the malware 122 while preserving privacy of the individual client devices 104a-104n using CLDP. Unlike some LDP methods which require collecting data from relatively large populations (e.g., on the order of millions of client devices) to derive accurate insights, the method 300 may be employed by the server device 106 on the relatively small population of the client devices 104a-104n (e.g., on the order of only thousands of client devices) and still derive accurate insights. Thus, the method 300 may accurately detect and diagnose a computer security threat such as an outbreak of the malware 122, resulting in the minimizing or preventing of damage to any of the client devices 104a-104n infected in the malware outbreak and/or the avoiding of infections of additional computers.

FIG. 4 illustrates an example computer system 400 that may be employed in identifying and protecting against computer security threats while preserving privacy of individual client devices using CLDP. In some embodiments, the computer system 400 may be part of any of the systems or devices described in this disclosure. For example, the computer system 400 may be part of any of the client devices 104a-104n, the server device 106, or the malicious network device 108 of FIG. 1.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more actions of the method 300 of FIG. 3. These computer-executable instructions may be included, for example, in the operating system 410, in one or more applications, such as in any of the CLDP applications 110a-110n or 116 or the malicious application 120 of FIG. 1, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more actions of the method 300 of FIG. 3. In some embodiments, the application 414 may be part of the operating system 410 or may be part of an application of the computer system 400, or may be some combination thereof. In some embodiments, the application 414 may function as any of the CLDP applications 110a-110n or 116 or the malicious application 120 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for identifying and protecting against computer security threats while preserving privacy of individual client devices using condensed local differential privacy (CLDP), at least a portion of the method being performed by a computer device comprising at least one processor, the method comprising:

accessing, at each of multiple local client devices, an actual data value;

generating, at each of the local client devices, a perturbed data value by adding noise to the actual data value, an amount of noise being added to each actual data value being probabilistically computed such that a probability of noise being added decreases as an amount of added noise increases;

sending, from each of the local client devices, the perturbed data value to a remote server device;

aggregating, at the remote server device, the perturbed data values to at least partially cancel out aggregate noise of the aggregated perturbed data values at a population level;

analyzing, at the remote server device, using CLDP, the aggregated perturbed data values to identify a computer security threat to the local client devices while preserving privacy of the actual data values by preventing the remote server device from inferring the actual data value of any of the local client devices; and in response to identifying the computer security threat, protecting against the computer security threat by performing, at one or more of the local client devices, a remedial action to protect the one or more local client devices from the computer security threat.

2. The method of claim 1, wherein the performing, at the one or more local client devices, of the remedial action comprises one or more of blocking the one or more local client devices from accessing a network, rolling back one or more changes at the one or more local client devices that were made in response to the computer security threat, or temporarily freezing activity at the one or more local client devices, or some combination thereof.

3. The method of claim 1, wherein:
each actual data value is an actual ordinal data value; and
the noise is added to each actual ordinal data value with a probability of noise being added decreasing exponentially as an amount of added noise increases.

4. The method of claim 1, wherein the computer security threat comprises a malware outbreak.

5. The method of claim 4, wherein:
the actual data values comprise information regarding a count and/or a frequency of malware-related detection events observed on each of the local client devices during a time period; and
the adding of noise to each actual data value comprises modifying the count and/or the frequency of the malware-related detection events to prevent the remote server device from inferring the actual count and/or the frequency of the malware-related detection events of any of the local client devices.

6. The method of claim 5, wherein:
the malware-related detection events comprise detection of a particular malware; and
the malware outbreak comprises an outbreak of the particular malware.

7. The method of claim 6, wherein the analyzing, at the remote server device, of the aggregated perturbed data values to identify the malware outbreak comprises analyzing, at the remote server device, the aggregated perturbed data values to identify a timing of the particular malware infecting the local client devices.

8. One or more non-transitory computer-readable media comprising one or more computer-readable instructions that, when executed by one or more processors of a computer device, cause the computer device to perform a method for identifying and protecting against computer security threats while preserving privacy of individual client devices, the method comprising:
accessing, at each of multiple local client devices, an actual data value;
generating, at each of the local client devices, a perturbed data value by adding noise to the actual data value, an amount of noise being added to each actual data value being probabilistically computed such that a probability of noise being added decreases as an amount of added noise increases;
sending, from each of the local client devices, the perturbed data value to a remote server device;
aggregating, at the remote server device, the perturbed data values to at least partially cancel out aggregate noise of the aggregated perturbed data values at a population level;
analyzing, at the remote server device, using condensed local differential privacy (CLDP), the aggregated perturbed data value to identify a computer security threat to the local client devices while preserving privacy of the actual data values by preventing the remote server device from inferring the actual data value of any of the local client devices; and
in response to identifying the computer security threat, protecting against the computer security threat by performing, at one or more of the local client devices, a remedial action to protect the one or more local client devices from the computer security threat.

9. The one or more non-transitory computer-readable media of claim 8, wherein the performing, at the one or more local client devices, of the remedial action comprises one or more of blocking the one or more local client devices from accessing a network, rolling back one or more changes at the one or more local client devices that were made in response to the computer security threat, or temporarily freezing activity at the one or more local client devices, or some combination thereof.

10. The one or more non-transitory computer-readable media of claim 8, wherein:
each actual data value is an actual ordinal data value; and
the noise is added to each actual ordinal data value with a probability of noise being added decreasing exponentially as an amount of added noise increases.

11. The one or more non-transitory computer-readable media of claim 8, wherein the computer security threat comprises a malware outbreak.

12. The one or more non-transitory computer-readable media of claim 11, wherein:
the actual data values comprise information regarding a count and/or a frequency of malware-related detection events observed on each of the local client devices during a time period; and
the adding of noise to each actual data value comprises modifying the count and/or the frequency of the malware-related detection events to prevent the remote server device from inferring the actual count and/or the frequency of the malware-related detection events of any of the local client devices.

13. The one or more non-transitory computer-readable media of claim 12, wherein:
the malware-related detection events comprise detection of a particular malware; and
the malware outbreak comprises an outbreak of the particular malware.

14. The one or more non-transitory computer-readable media of claim 13, wherein the analyzing, at the remote server device, of the aggregated perturbed data values to identify the malware outbreak comprises analyzing, at the remote server device, the aggregated perturbed data values to identify a timing of the particular malware infecting the local client devices.

15. A remote server device comprising:
one or more processors; and
one or more non-transitory computer-readable media comprising one or more computer-readable instructions that, when executed by the one or more processors, cause the remote server device to perform a method for identifying and protecting against computer security threats while preserving privacy of individual client devices, the method comprising:
receiving, at the remote server device from local client devices, perturbed data values, the perturbed data values resulting from actual data values being accessed and then the perturbed data values being generated at each the local client devices by adding noise to each actual data value, an amount of noise being added to each actual data value being probabilistically computed such that a probability of noise being added decreases as an amount of added noise increases;

aggregating, at the remote server device, the perturbed data values to at least partially cancel out aggregate noise of the aggregated perturbed data values at a population level;

analyzing, at the remote server device, using condensed local differential privacy (CLDP), the aggregated perturbed data values to identify a computer security threat to the local client devices while preserving privacy of the actual data values by preventing the remote server device from inferring the actual data value of any of the local client devices; and in response to identifying the computer security threat, protecting against the computer security threat by directing performance, at one or more of the local client devices, of a remedial action to protect the one or more local client devices from the computer security threat.

16. The remote server device of claim 15, wherein the performance, at the one or more local client devices, of the remedial action comprises one or more of blocking the one or more local client devices from accessing a network, rolling back one or more changes at the one or more local client devices that were made in response to the computer security threat, or temporarily freezing activity at the one or more local client devices, or some combination thereof.

17. The remote server device of claim 15, wherein:
each actual data value is an actual ordinal data value; and
the noise is added to each actual ordinal data value with a probability of noise being added decreasing exponentially as an amount of added noise increases.

18. The remote server device of claim 15, wherein the computer security threat comprises a malware outbreak.

19. The remote server device of claim 18, wherein:
the actual data values comprise information regarding a count and/or a frequency of malware-related detection events observed on each of the local client devices during a time period;

the adding of noise to each actual data value comprises modifying the count and/or the frequency of the malware-related detection events to prevent the remote server device from inferring the actual count and/or the frequency of the malware-related detection events of any of the local client devices;

the malware-related detection events comprise detection of a particular malware; and the malware outbreak comprises an outbreak of the particular malware.

20. The remote server device of claim 19, wherein the analyzing, at the remote server device, of the aggregated perturbed data values to identify the malware outbreak comprises analyzing, at the remote server device, the aggregated perturbed data values to identify a timing of the particular malware infecting the local client devices.

* * * * *